United States Patent
Peaker et al.

(10) Patent No.: US 7,669,866 B2
(45) Date of Patent: Mar. 2, 2010

(54) SUSPENSION TRAILING ARM (75) Inventors: Martin Peaker, Chester (GB); David Chan, Flintshire (GB)

(73) Assignee: Meritor Heavy Vehicles Systems Limited, Clwyd (GB)

( * ) Notice: Subject to any disclaimer, the term of this patent is extended or adjusted under 35 U.S.C. 154(b) by 306 days.

(21) Appl. No.: 11/446,455

(22) Filed: Jun. 2, 2006

(65) Prior Publication Data

US 2007/0158924 A1 Jul. 12, 2007

(30) Foreign Application Priority Data

Jun. 3, 2005 (GB) ................... 0511310.5

(51) Int. Cl.
*B60G 3/014* (2006.01)
*B60G 11/028* (2006.01)

(52) U.S. Cl. .................. 280/124.128; 280/124.132; 280/124.116; 280/124.108

(58) Field of Classification Search .......... 280/124.116, 280/124.108, 124.128, 124.11, 124.132
See application file for complete search history.

(56) References Cited

U.S. PATENT DOCUMENTS

| 1,987,791 A | * | 1/1935 | Opolo ................ 280/124.128 |
| 2,181,546 A | * | 11/1939 | Bradshaw ............ 280/124.116 |
| 3,490,786 A | * | 1/1970 | Ravenel ............... 280/124.101 |
| 3,751,066 A | | 8/1973 | Narahari |
| 3,802,718 A | * | 4/1974 | Schaeff ............... 280/124.116 |
| 4,152,011 A | * | 5/1979 | Sano et al. ........... 280/124.101 |
| 4,787,680 A | * | 11/1988 | Bonjean et al. ......... 301/124.1 |
| 4,858,949 A | | 8/1989 | Wallace et al. |
| 5,203,585 A | | 4/1993 | Pierce |
| 5,366,237 A | * | 11/1994 | Dilling et al. ......... 280/124.116 |
| 5,639,110 A | | 6/1997 | Pierce et al. |
| 6,022,035 A | | 2/2000 | Habich |
| 6,039,336 A | * | 3/2000 | Frey .................... 280/124.128 |
| 6,074,016 A | * | 6/2000 | Blondelet et al. ........... 301/127 |
| 6,425,593 B2 | | 7/2002 | Fabris et al. |
| 6,471,223 B1 | | 10/2002 | Richardson |
| 6,491,314 B2 | | 12/2002 | Smith et al. |
| 6,508,482 B2 | | 1/2003 | Pierce et al. |
| 6,557,875 B2 | | 5/2003 | Schlosser et al. |
| 6,672,604 B2 | | 1/2004 | Eveley |
| 6,733,020 B2 | | 5/2004 | Reineck |
| 6,851,689 B2 | | 2/2005 | Dudding et al. |

(Continued)

FOREIGN PATENT DOCUMENTS

DE 100 55 859 5/2002

(Continued)

OTHER PUBLICATIONS

European Search Report dated Sep. 19, 2006.
United Kingdom Search Report dated Aug. 26, 2005.

*Primary Examiner*—Paul N. Dickson
*Assistant Examiner*—Timothy Wilhelm
(74) *Attorney, Agent, or Firm*—Carlson, Gaskey & Olds (57) ABSTRACT

A suspension trailing arm suspends a vehicle chassis from a beam type axle. The trailing arm includes a chassis mounting feature, an axle mounting feature, and an arm portion intermediate the chassis mounting feature and the axle mounting feature. The arm portion has a generally X-section profile with four limbs.

19 Claims, 9 Drawing Sheets

U.S. PATENT DOCUMENTS

| | | |
|---|---|---|
| 7,007,960 B2 | 3/2006 | Chalin et al. |
| 7,267,348 B1 * | 9/2007 | Klein et al. ............ 280/124.128 |
| 7,347,435 B2 | 3/2008 | Chalin |
| 2001/0035622 A1 | 11/2001 | Fabris et al. |
| 2002/0117829 A1 | 8/2002 | Platner |
| 2003/0146592 A1 | 8/2003 | Chalin et al. |
| 2004/0051268 A1 | 3/2004 | Chan et al. |
| 2004/0256829 A1 | 12/2004 | Chalin et al. |
| 2005/0051986 A1 | 3/2005 | Galazin et al. |
| 2005/0082783 A1 | 4/2005 | Ramsey et al. |
| 2006/0033304 A1 | 2/2006 | Saieg et al. |
| 2006/0237939 A1 | 10/2006 | Hicks |
| 2007/0158924 A1 | 7/2007 | Peaker et al. |

FOREIGN PATENT DOCUMENTS

| | | |
|---|---|---|
| EP | 0 229 576 | 7/1987 |
| EP | 0 243 191 | 10/1987 |
| WO | WO 2004/054825 | 7/2004 |
| WO | WO 2005/028221 | 3/2005 |

* cited by examiner

SUSPENSION TRAILING ARM

REFERENCE TO RELATED APPLICATION

This application claims priority to United Kingdom Patent Application GB 0511310.5 filed on Jun. 3, 2005.

BACKGROUND OF THE INVENTION

The present invention relates generally to a suspension trailing arm. More particularly, the present invention relates to a suspension trailing arm having a portion with a generally X-section profile and a suspension assembly incorporating the trailing arm.

Heavy commercial vehicles typically employ trailing arm suspension systems, particularly in relation to axles of trailers of articulated vehicles or, potentially, rear axles of rigid body vehicles.

Heavy commercial vehicles (including trucks, buses and coaches) can be distinguished from light commercial vehicles (such as vans) and light passenger vehicles due to one or more of the following characteristics: 1) a laden weight in excess of approximately 3.5 tonnes and 2) the use of air actuated brakes as opposed to hydraulically actuated brakes (because air actuated brakes are better able to withstand the increased heat generated by the repeated braking of a vehicle having a weight in excess of approximately 3.5 tonnes).

Such vehicles (including associated trailers) also typically employ a pair of spaced parallel beams that run the length of the vehicle and act as a chassis upon which a vehicle body is mounted. The trailing arm suspension system includes trailing arms.

When used in heavy commercial vehicles, a front of each trailing arm is typically pivotally mounted to a chassis beam of the vehicle. Each trailing arm extends rearwardly (i.e., towards the rear of the vehicle) to a mounting position for an axle and then further rearwardly to a mounting surface for an air spring that is mounted between the trailing arm and the chassis beam. Axles in such vehicles are typically substantially rigid beam-type axles (i.e., axles that extend between spindles upon which wheels at opposite sides of the vehicle are mounted). In some circumstances, the orientation of the trailing arms may be reversed to pivot at a rear of the trailing arm, in which case they are known as "leading arms." For the purposes of this specification, the term trailing arm should also be understood to encompass a leading arm.

Known heavy vehicle trailing arms are typically constructed either from solid spring steel provided with U-bolts and plates to connect the axle to the trailing arm, a fabricated steel plate which is then welded to the axle or an axle adapter, or a hybrid of the two types. An example of a fabricated trailing arm is disclosed in U.S. Pat. No. 5,639,110 (Pierce et al.). Both prior art types of trailing arms provide a rigid connection between the trailing arm and the axle to resist bending, but provide a resilient connection between the chassis and the axle either by flexing the spring steel trailing arm or by flexing a large elastomeric bush (resilient bearing) in an end of the fabricated trailing arm. This enables articulation forces induced during vehicle use to be taken up, while maintaining tracking and roll stability.

It is known from the present applicant's earlier published application WO 2004/054825 to cast or forge trailing arms having an I- or C-section profile and a direct beam-to-axle connection. Such trailing arms provide advantages over fabricated and spring steel arms in terms of their manufacture, strength and packaging.

Cast and forged trailing arms tend to be made with "traditional" beam-type profiles, whereas the applicant has now recognized that there is scope for further improvements to be achieved in strength, durability and weight reduction for trailing arms by moving away from such traditional shapes.

SUMMARY OF THE INVENTION

Accordingly, a first aspect of the present invention provides a suspension trailing arm for suspending a vehicle chassis from a beam type axle. The trailing arm includes a chassis mounting feature, an axle mounting feature, and an arm portion intermediate the chassis mounting feature and the axle mounting feature. The arm portion has a generally X-section profile with four limbs.

A second aspect of the invention provides a heavy vehicle suspension assembly including a first trailing arm and a second trailing arm. Each of the trailing arms include a chassis mounting formation, an axle mounting formation and an arm portion having a generally X-section profile with four limbs. The vehicle suspension assembly further includes an axle beam that extends between the trailing arms, and which is secured to the trailing arms at the axle mounting formations.

BRIEF DESCRIPTION OF THE DRAWINGS

Embodiments of the present invention are now described, by way of example only, with reference to the accompanying drawings in which.

DETAILED DESCRIPTION OF THE PREFERRED EMBODIMENT

Figure 1:
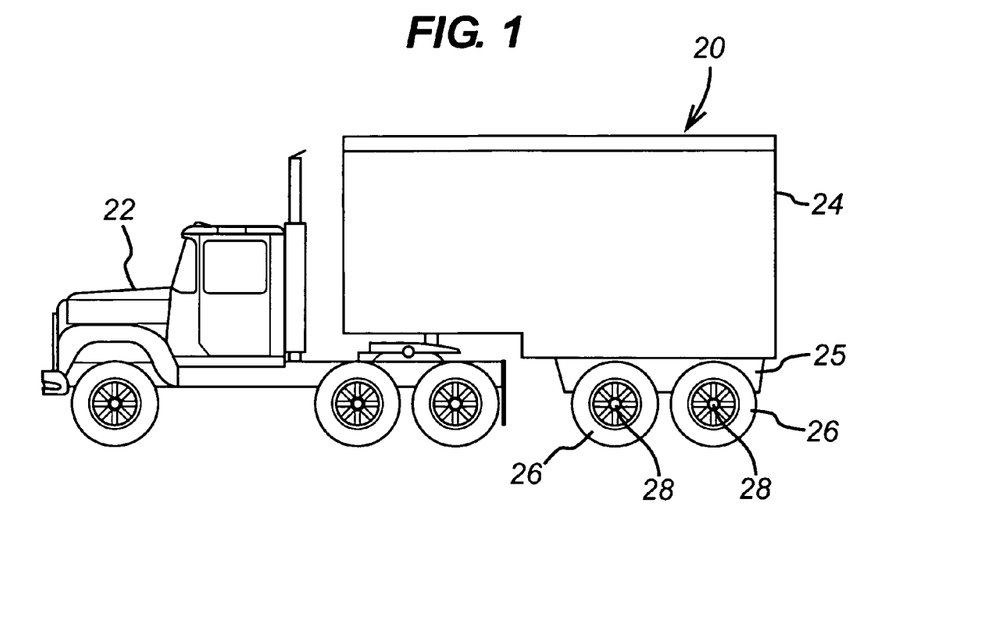
FIG. 1 is a side view of a typical heavy commercial vehicle.

FIG. 1 shows a heavy commercial vehicle 20 including a tractor portion 22 and a trailer portion 24 mounted for articulation relative to the tractor portion 22. A plurality of wheels 26 are suspended from a trailer chassis 25 of the trailer portion 24 so that the wheels 26 rotate about axes 28.

Figure 2:
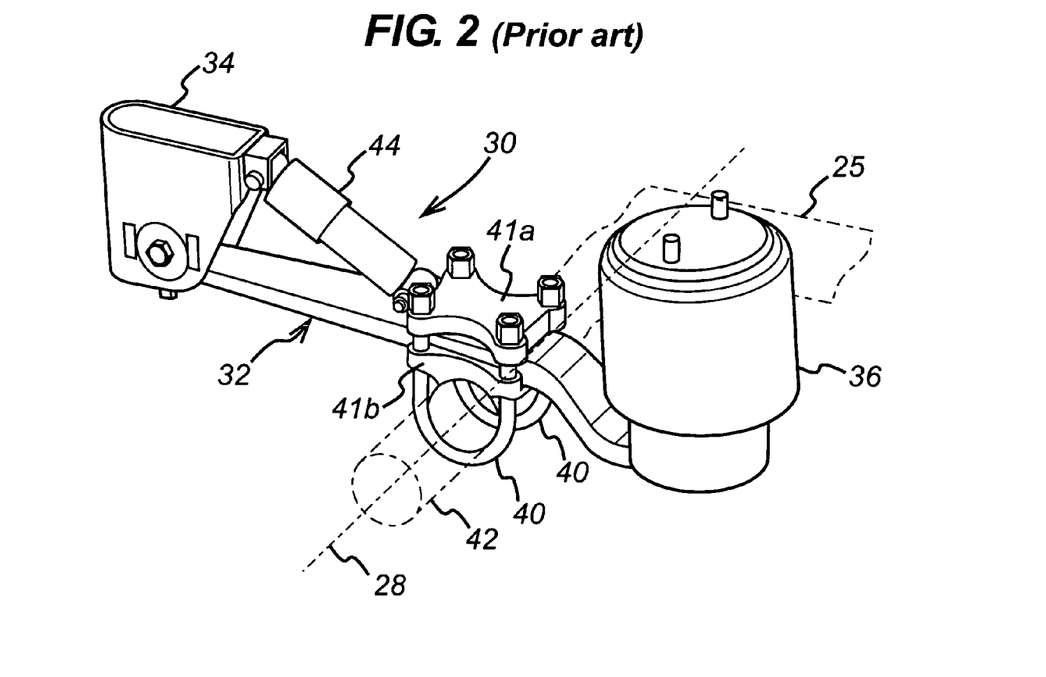
FIG. 2 is a perspective view of a prior art suspension assembly.

FIG. 2 shows a prior art suspension assembly 30 including a spring steel suspension trailing arm 32, a chassis support bracket 34 and an air spring 36. The chassis support bracket 34 and the air spring 36 provide a connection with, and suspension relative to, the trailer chassis 25 (shown in broken lines for clarity) in a known manner. U-bolts 40 and top and bottom plates 41a and 41b, respectively, mount an axle 42 (shown in broken lines for clarity) to the trailing arm 32. In particular, it should be noted that the bottom plate 41b is welded directly to the axle 42. Wheels (not shown) are secured to each end of the axle 42 for rotation about the axis 28. A damper 44 mounted between the chassis support bracket 34 and the assembly of the U-bolt 40 and the plates 41a and 41b is provided to damp oscillations of the axle 42 relative to the trailer chassis 25 as the vehicle 20 drives over uneven ground.

A considerable amount of assembly is required, and a large number of components are needed to provide this type of complete suspension assembly.

Figure 3:
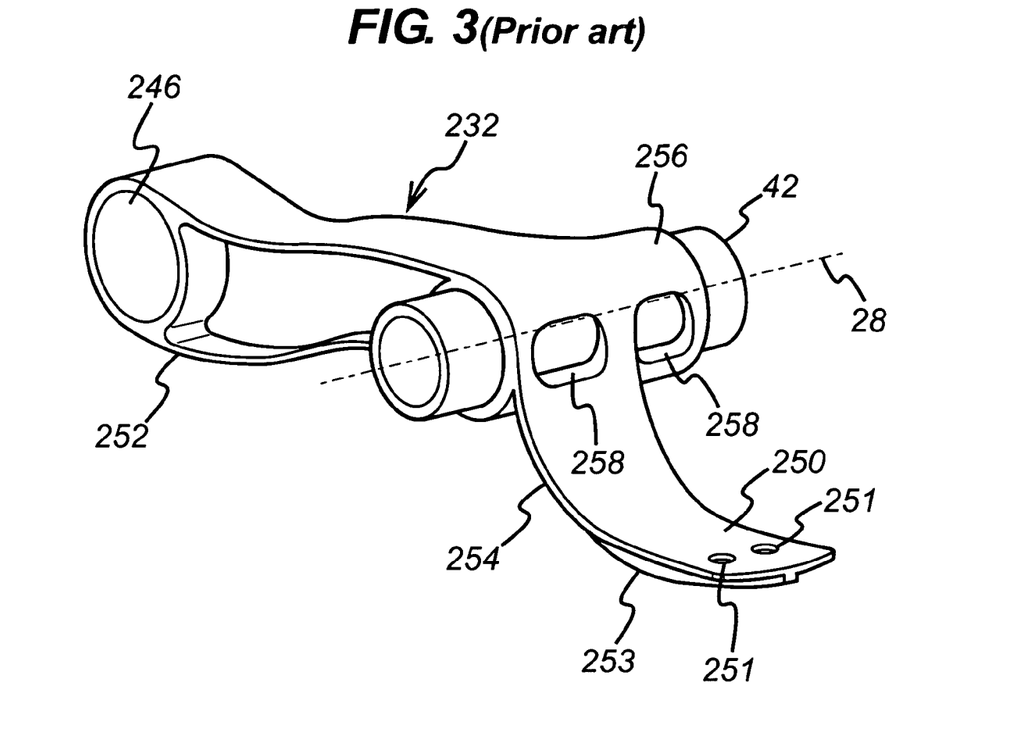
FIG. 3 is a perspective view of another prior art suspension trailing arm.
Figure 4:
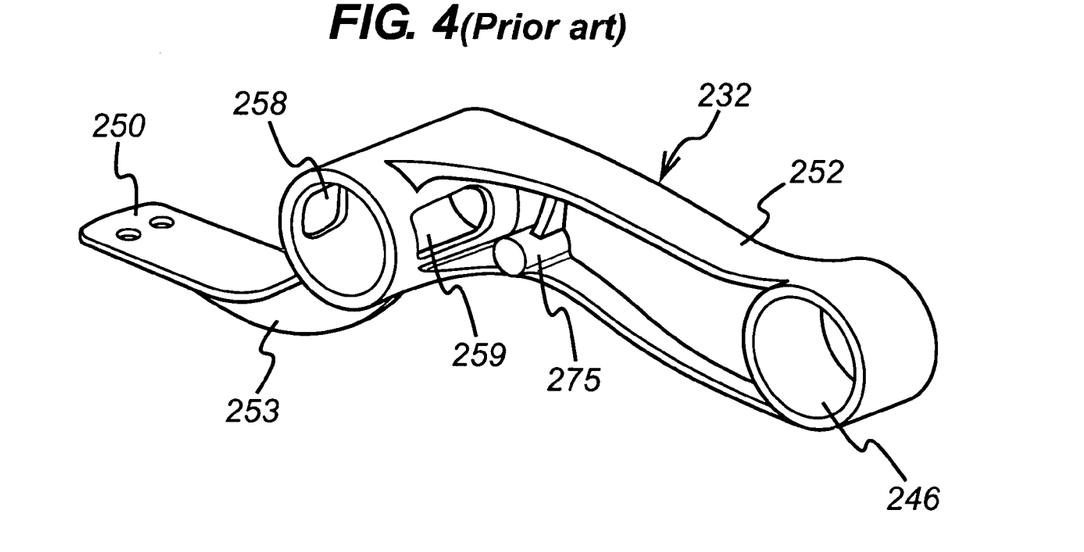
FIG. 4 is a perspective view of another prior art suspension trailing arm.

FIGS. 3 and 4 show a trailing arm 232 of the type shown in the applicant's earlier published application WO 2004/054825, to which a conventional beam-type axle 42 is mounted (FIG. 3 only). The trailing arm 232 is cast as a single piece or in two pieces and includes a front portion 252 and a rear portion 254 separated by an axle locating portion or feature in the form of a cast axle wrap 256 dimensioned to receive the axle 42 therethrough.

A leading end of the front portion 252 is cast to provide a bearing mounting 246 to receive a resilient bearing (not shown) that mounts the trailing arm 232 to a chassis support bracket (not shown) in a similar manner to the trailing arm 32 of FIG. 2. Intermediate the axle wrap 256 and the bearing mounting 246, the front portion 252 is cast with an I-section profile. The front portion 252 is further provided with a boss 275 for the mounting of a damper (not shown).

The rear portion 254 is provided with an upwardly facing substantially planar surface 250 upon which an air spring (not shown) may be received. Through holes 251 may further be provided on the substantially planar surface 250 to securely locate the air spring on the substantially planar surface 250 by the use of bolts therethrough, for example. A downwardly extending web 253 may be provided therein to form a shallow T-section and impart sufficient strength to this portion of the trailing arm 232.

Openings 258 are provided in the cast wall that constitutes the axle wrap 256. The openings 258 enable the axle 42 to be securely ring or fillet welded to the trailing arm 232 around an edge of the openings 258. A similar opening 259 is provided on the opposite side of the axle wrap 256 for a similar purpose. The trailing arm 232 may be cast or forged from iron or steel.

Figure 5:
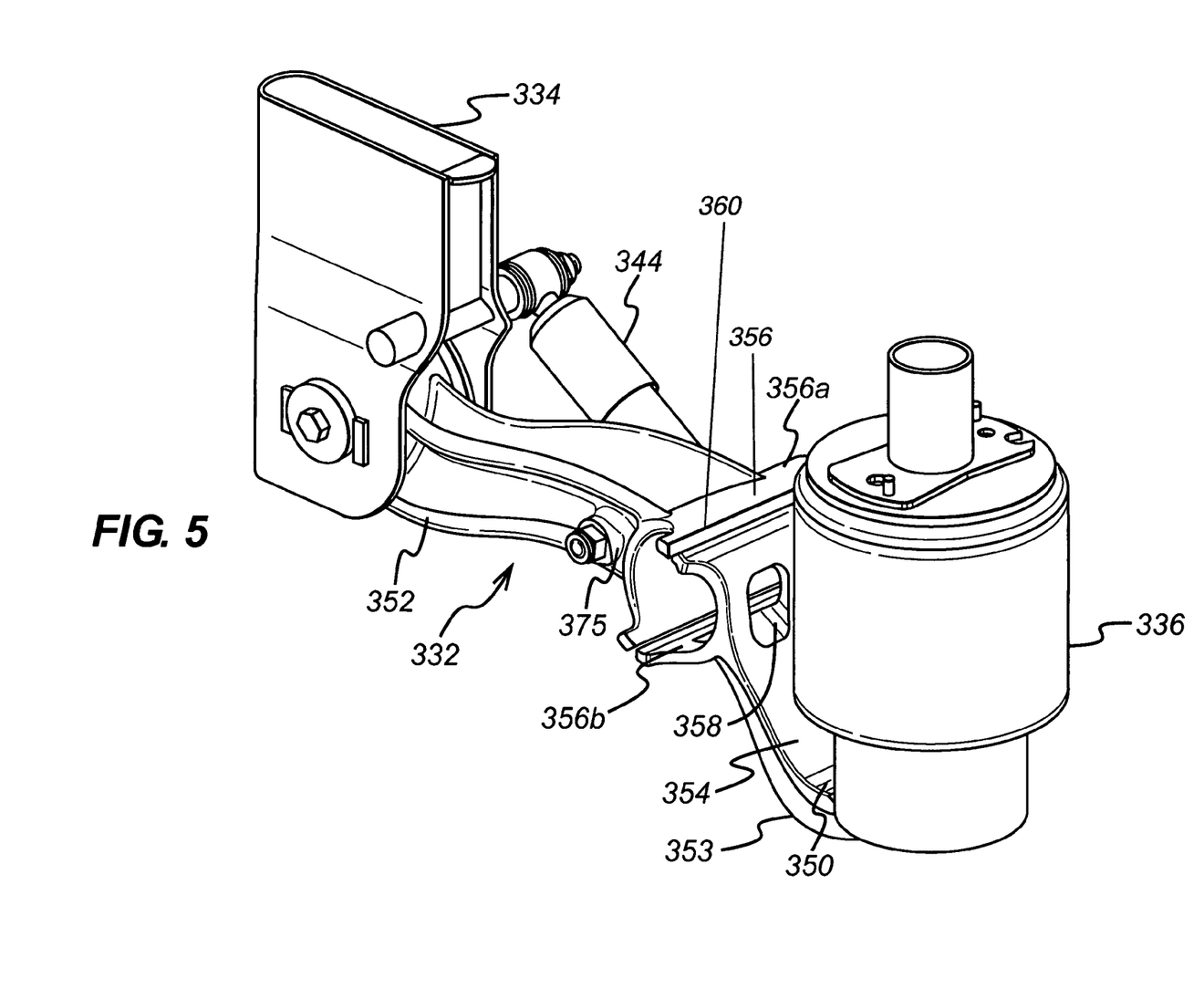
FIG. 5 is a perspective view of a suspension trailing arm according to an embodiment of the present invention together with various ancillary components.
Figure 6:
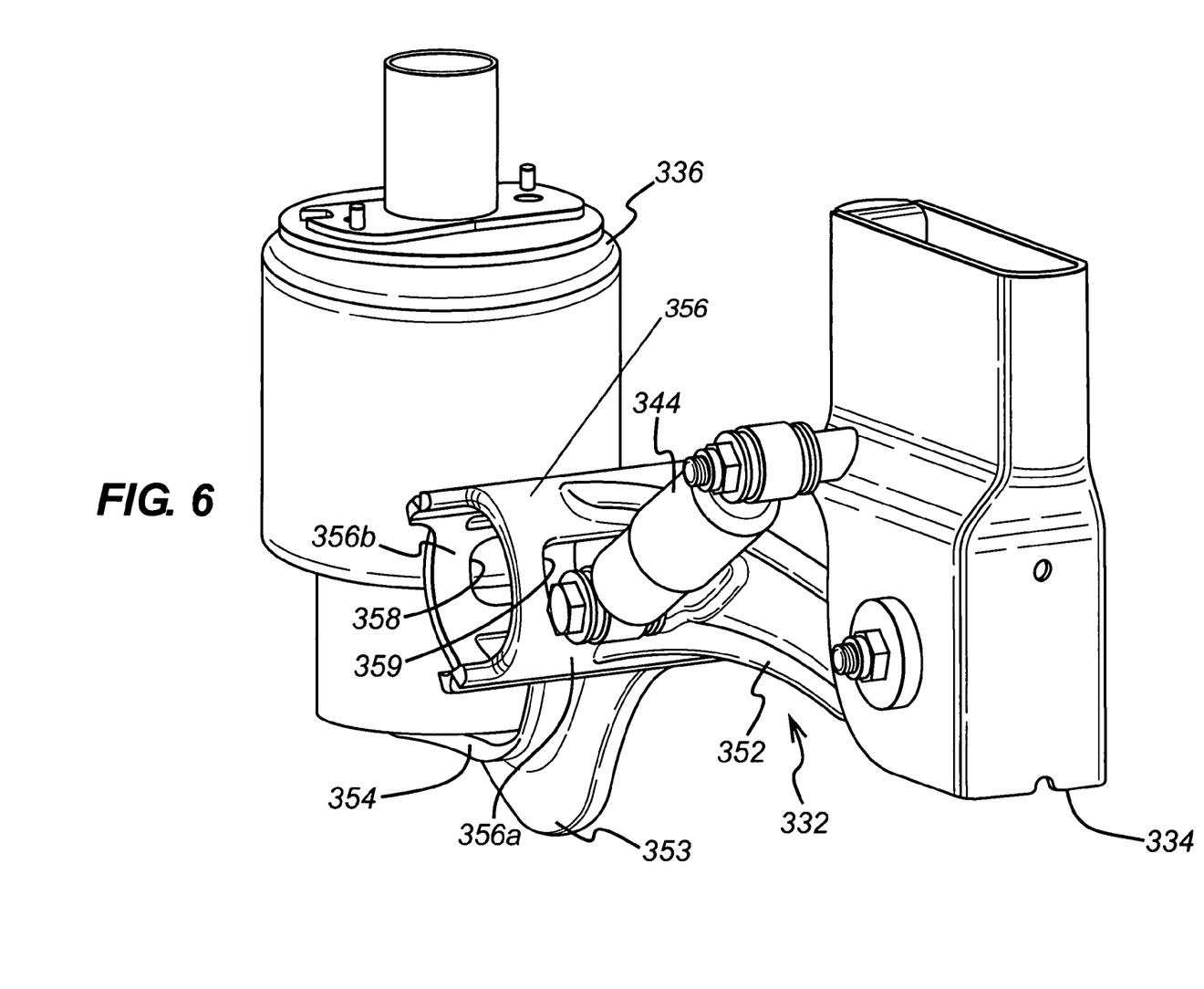
FIG. 6 is a perspective view of a suspension trailing arm according to an embodiment of the present invention together with various ancillary components.

Referring to FIGS. 5 and 6, a trailing arm 332 according to the present invention (together with various ancillary components) is illustrated in which like parts have been designated where possible by like numerals with respect to FIGS. 3 and 4, but with the prefix "2" being replaced by the prefix "3."

A front arm portion 352 is provided as a separate piece from a rear arm portion 354 (although the two may have been cast or forged together and subsequently separated). Thus, an axle wrap 356 is constituted from two separate axle wrap portions 356a and 356b of the front arm portion 352 and the rear arm portion 354, respectively. As in the prior art trailing arm 232 of FIGS. 3 and 4, windows or openings 358 and 359 are provided in the wrap portions 356a and 356b. The openings 358 and 359 permit each wrap portion 356a and 356b to be independently ring or fillet welded to an axle 42 (shown in FIG. 2).

Specifically, the trailing arm 332 is secured at a leading edge of the front arm portion 352 to a hanger bracket 334 (chassis support) via a resilient bearing that is not visible. A damper 344 is pivotally mounted to both the hanger bracket 334 and the front arm portion 352 to damp the up and down motion of the trailing arm 332, in use. A mounting feature in the form of a mounting hole (not visible) in a thickened mounting boss 375 extends transversely through the front arm portion 352 of the trailing arm 332, such that the damper 344 may be secured to the trailing arm 332 by a bolt and nut connection through the mounting boss 375.

The rear arm portion 354 is provided with upwardly facing substantially planar surface 350 upon which an air spring 336 is received. An upper end of the air spring 336 may be secured to an underside of the chassis, as is well known. Through holes (non visible) may be provided on the substantially planar surface 350 to securely locate the air spring 336 on the substantially planar surface 350 by the use of bolts, for example. A downwardly extending web 353 may be provided therein to form a shallow T-section to impart sufficient strength to the rear arm portion 354.

As shown in the prior art of FIGS. 3 and 4, the openings 358 and 359 are provided, respectively, in the cast wall that constitutes the front part and the rear part of axle wrap portions 356a and 356b, respectively. The openings 358 and 359 enable the axle 42 to be securely ring or fillet welded to the trailing arm 332 around an edge of the openings 358 and 359 to ensure a secure connection between the trailing arm 332 and the axle 42. The welding process is discussed in more detail below.

The trailing arm 332 of the present invention differs from the prior art primarily in that the front arm portion 352 intermediate the chassis mounting feature and the axle mounting feature has a generally X-section profile. The particular shape of this X-section is illustrated more clearly in FIGS. 7A to 9.

Figure 7A:
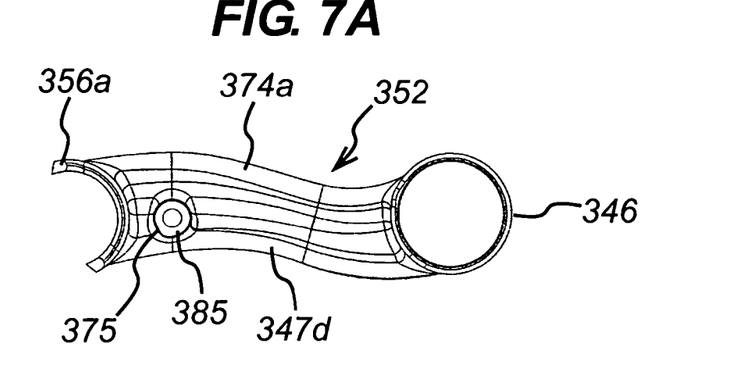
FIG. 7A is a side view illustrating a portion of the trailing arm of FIGS. 5 and 6.
Figure 7B:
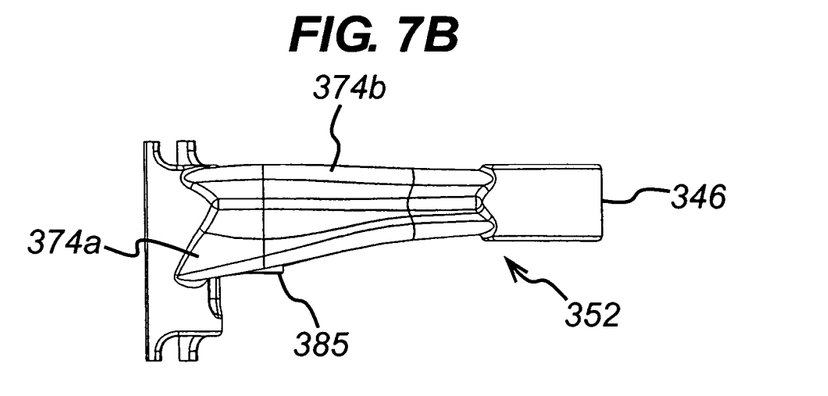
FIG. 7B is a top view illustrating a portion of the trailing arm of FIGS. 5 and 6.
Figure 7C:
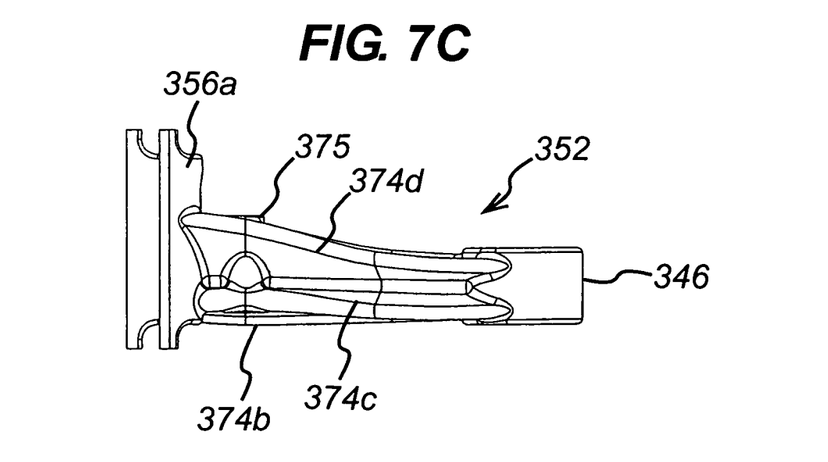
FIG. 7C is a bottom view illustrating a portion of the trailing arm of FIGS. 5 and 6.
Figure 7D:
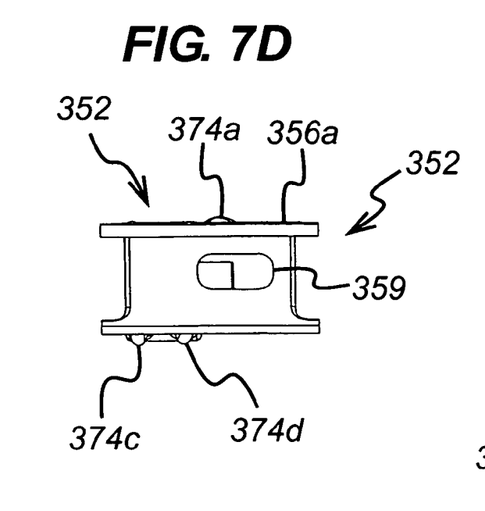
FIG. 7D is an end view illustrating a portion of the trailing arm of FIGS. 5 and 6.
Figure 7E:
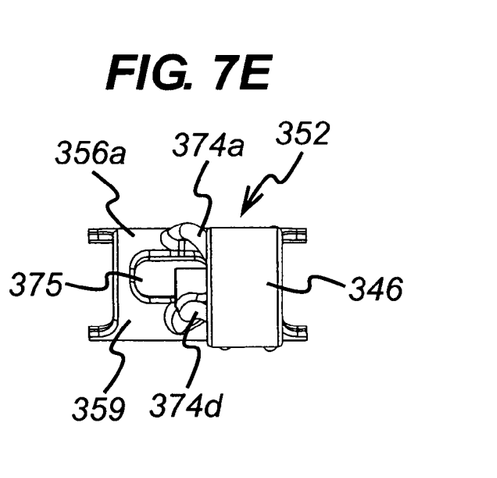
FIG. 7E is an end view illustrating a portion of the trailing arm of FIGS. 5 and 6.
Figure 9:
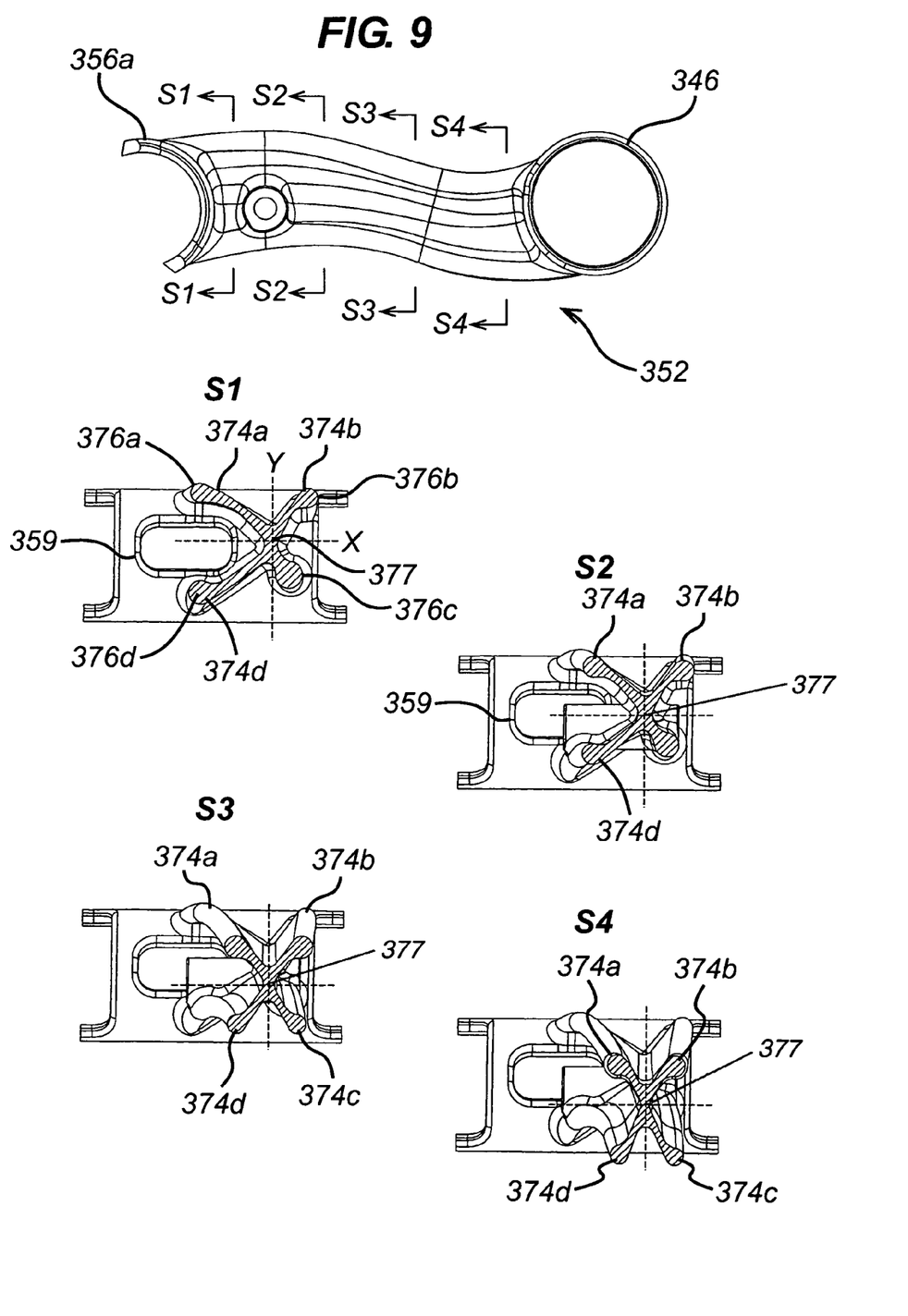
FIG. 9 illustrates various transverse cross-sections through a portion of the trailing arm of FIGS. 5 and 6.

With reference to these figures, the profile of the X-section varies along a length of the front arm portion 352 in a number of different ways. With reference in particular to FIG. 9 and the cross sections S1 to S4, the X-section includes a first limb 374a, a second limb 374b, a third limb 374c and a fourth limb 374d that converge to a center point 377. Each limb 374a, 374b, 374c and 374d terminates in an enlarged free end portion 376a, 376b, 376c and 376d, respectively. As shown in FIG. 7A, the front arm portion 352 generally, and each limb 374a, 374b, 374c and 374d specifically, follows a generally S-shaped path from a chassis bush 346 to the axle wrap portion 356a. This has advantages in terms of the packaging of the other components around the trailing arm 332, such as brake actuators, while at the same time maintaining the strength of the trailing arm 332. As shown in FIGS. 7A to 7E, as well as FIGS. 5 and 6, the front arm portion 352 merges smoothly into the chassis bush 346 and the axle wrap portion 356a to avoid locations that act as stress raisers when the trailing arm 332 is in use.

With reference to the transverse cross sections through the arm portion S1 to S4, some considerable variations can be seen in the size and shape of each limb 374a, 374b, 374c and 374d along the length of the front arm portion 352.

Starting near a front of the front arm portion 352 at the cross section S4, and considering the first limb 374a, it is apparent that the first limb 374a extends from the center point 377 at approximately 60° relative to an X-axis extending laterally through the center point 377 near the front of the front arm portion 352 and terminates in a free end portion 376a having a relatively bulbous shape. As the first limb 374a extends rearwards, an angle with respect to the X-axis becomes progressively shallower so that the angle is approximately 45° relative to the X-axis proximate to the center point 377 at the cross section S1 near the axle wrap portion 356a, but the angle becomes progressively shallower near the free end portion 376a so that the angle proximate the free end portion 376a is around 20° with respect to the X-axis. In addition, the free end portion 376a is somewhat less bulbous than at the cross-section S4. The lengthening of the first limb 374a proximate the axle wrap portion 356a reflects the greater need for resistance to bending moments about a vertical axis Y imposed on the trailing arm 332 proximate the axle wrap 356 due to forces induced on the axle 42 in cornering.

The second limb 374b is substantially a mirror image of the first limb 374a about a Y-axis proximate the chassis bush 346, as shown in the cross section S4. However, in this embodiment, the angle of the second limb 374b varies only slightly along the length of the front arm portion 352. Similarly, the thickness of the second limb 374b and the size and the shape of the free end portion 376b varies only slightly along the length of the front arm portion 352. However, in common with the rest of the front arm portion 352, the second limb 374b follows the generally S-shaped curve along the length.

The third limb 374c is angled downwardly from the X-axis by approximately 60° and has a relatively small bulbous free end portion 376c proximate the chassis bush 346 and a relatively thin web intermediate the center point 377 and the free end portion 376c. As the third limb 374c extends towards the axle wrap portion 356a, the length of the third limb 374c overall, and the length of the web portion in particular, reduces. The size of the bulbous free end portion 376c increases so that a depth of the third limb 374c in both the X and Y directions decreases towards the axle wrap portion 356a. This particular shape provides more space for the fitment of a disc brake and an associated actuator outboard of the third limb 374c, as well as underneath the third limb 374c. As the third limb 374c approaches the axle wrap portion 356a, it merges into the boss 375 provided for the fitment of the damper 344 before reverting to its original shape.

The fourth limb 374d extends substantially as a mirror image of the first limb 347a about the X-axis. The fourth limb 374d extends from a starting point proximate the chassis bush 346 with a lowest point that is slightly higher than the third limb 374c and then merges with the axle wrap portion 356a at a significantly lower point by comparison with the third limb 374c. In this way, it avoids interference with the opening 359 in the axle wrap portion 356a. Although the fourth limb 374d is largely a mirror image of the first limb 374a, the bulbous free end portion 376d includes more material than the corresponding free end portion 376a of the first limb 374a near the axle wrap portion 356a. Additionally, the fourth limb 374d is substantially straight along its radial length, rather than having the curved shape of the first limb 374a. Again, the fourth limb 374d merges into the boss 375 proximate the axle wrap portion 356a before reverting to its original shape when merging into the axle wrap portion 356a.

Along the length of the front arm portion 352, all surfaces of the trailing arm 332 are smooth and rounded to avoid any locations that act as stress raisers.

The trailing arm 332 may be made using any suitable casting or forging process and may be cast or forged from any suitable material having sufficient strength and durability properties for this particular application, such as cast iron or cast steel. One advantage of cast steel is that the weldability of the trailing arm 332 is improved. In some embodiments, surfaces of the trailing arm 332 are machined to provide a suitable surface finish for fitment to the axle 42 or other components or to remove any stress raising surface contours. The trailing arm 332 is of sufficient strength for use in suspending the axle 42, which is rated at six tonnes.

The shape of the trailing arm 332 has arisen out of a recognition that box-sections, I-sections and the like, which have conventionally been used in the construction of trailing arms, do not represent an optimum solution for high strength and low weight arms when other factors, such as the packaging of brake and actuator components and cornering loads, are considered. The use of a substantially X-section together, in particular, with enlarged free end portions along the length thereof, enables the trailing arm 332 to be designed for a particular application with the optimum second moment of area and bending strength in the necessary locations. The geometry, the shape and the thickness of the trailing arm 332 may be altered in a number of different ways to optimize the strength to weight ratio.

Figure 10:
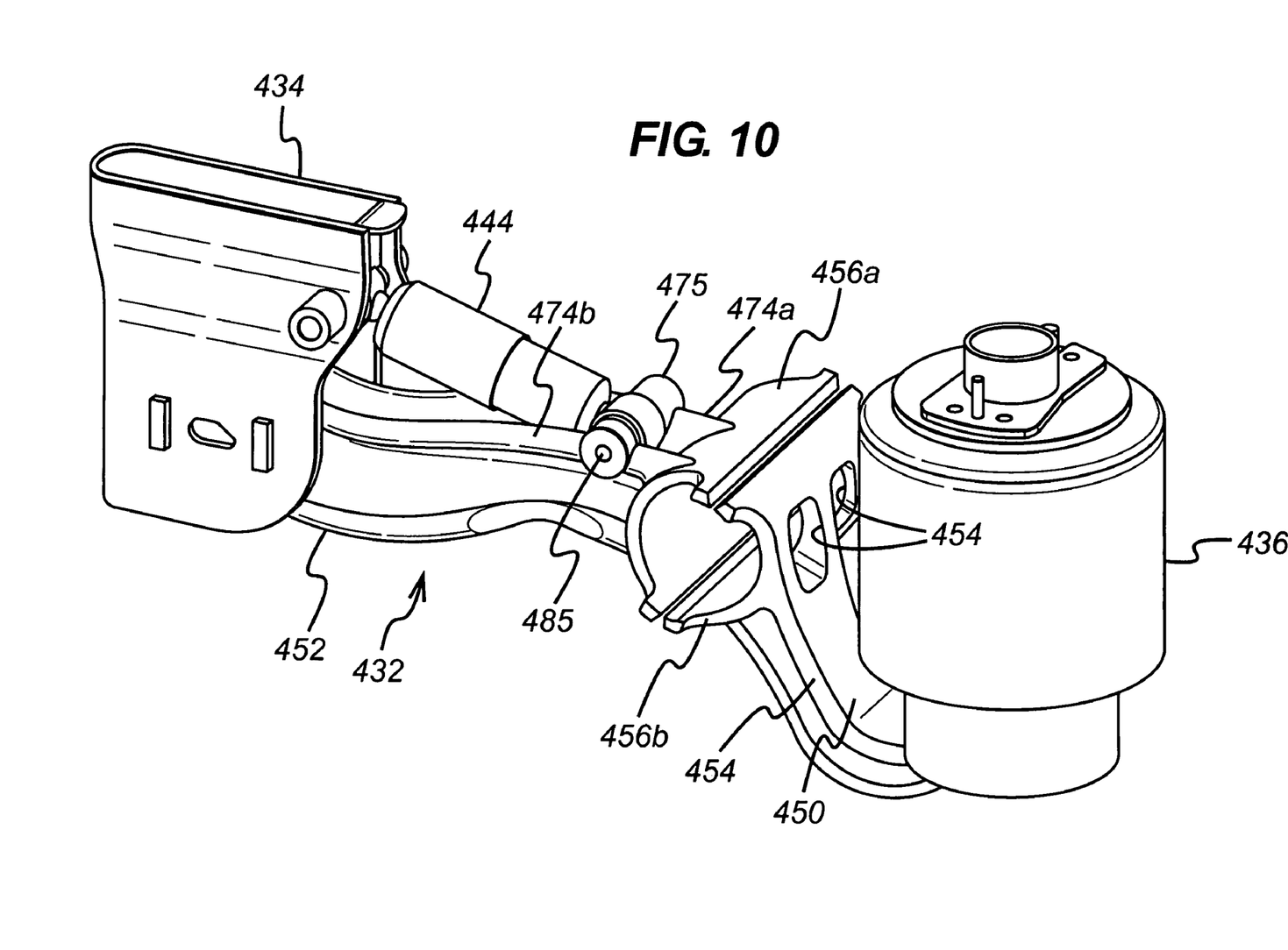
FIG. 10 is a perspective view of a trailing arm according to a second embodiment of the present invention together with various ancillary components.

With reference to FIG. 10, a second embodiment of the present invention is shown where like parts have been designated by like numerals, where possible, but with the prefix "4" replacing the prefix "3."

The second embodiment differs from the first embodiment in that the damper mounting feature on the trailing arm 432 includes two aligned bosses 475 with coaxial bores 485 positioned on top of the first limb 474a and the fourth limb 474d with a gap in between. A bolt can extend therethrough, and the damper 444 can sit within a trough between the first limb 474a and the fourth limb 474d. This arrangement is particularly advantageous since it minimizes the clearance required to mount the damper 444 directly above the trailing arm 432 when compared to existing conventional arms. Furthermore, the relocation of the boss 475 enables a portion of the second limb 474b to be cut away and thereby provide more clearance for brake components, in particular.

Figure 11:
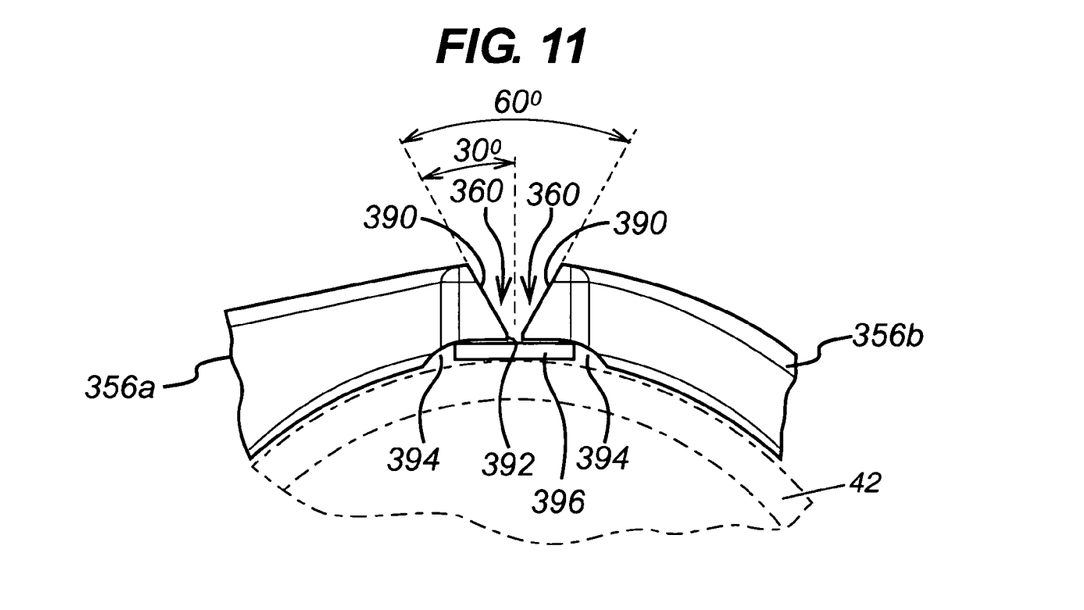
FIG. 11 is a detail view of mating edges of front and rear portions of an axle wrap of the trailing arm of the first embodiment.
Figure 12:
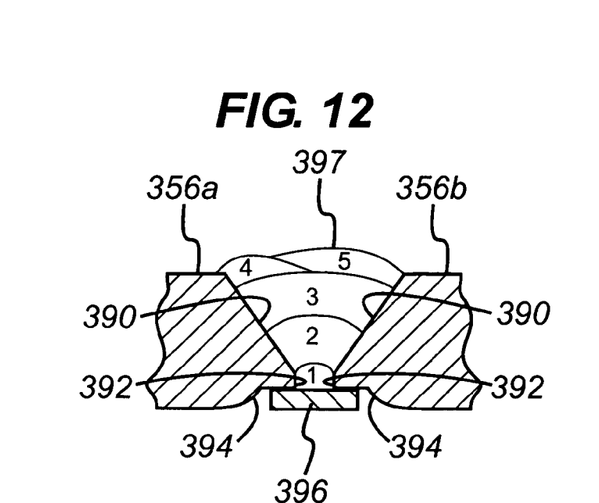
FIGS. 12 and 13 are detail cross-sectional views of the welds along the mating edge and opening edges of the trailing arm of the first embodiment.
Figure 13:
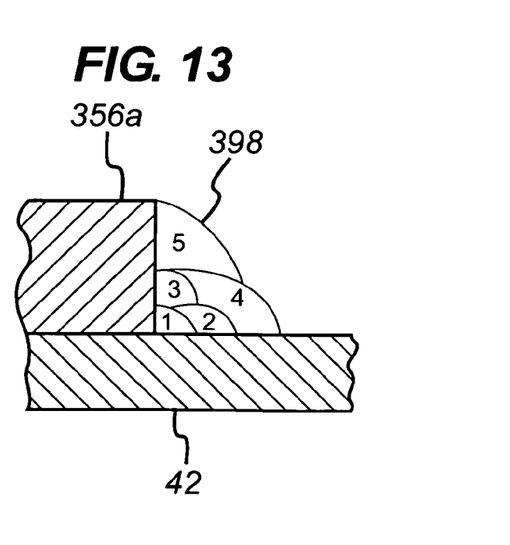

With reference to FIGS. 11 to 13, the currently preferred method of welding the front section and the rear section of the trailing arm 332 of the present invention to an axle 42 and to each other are shown.

Figure 8:
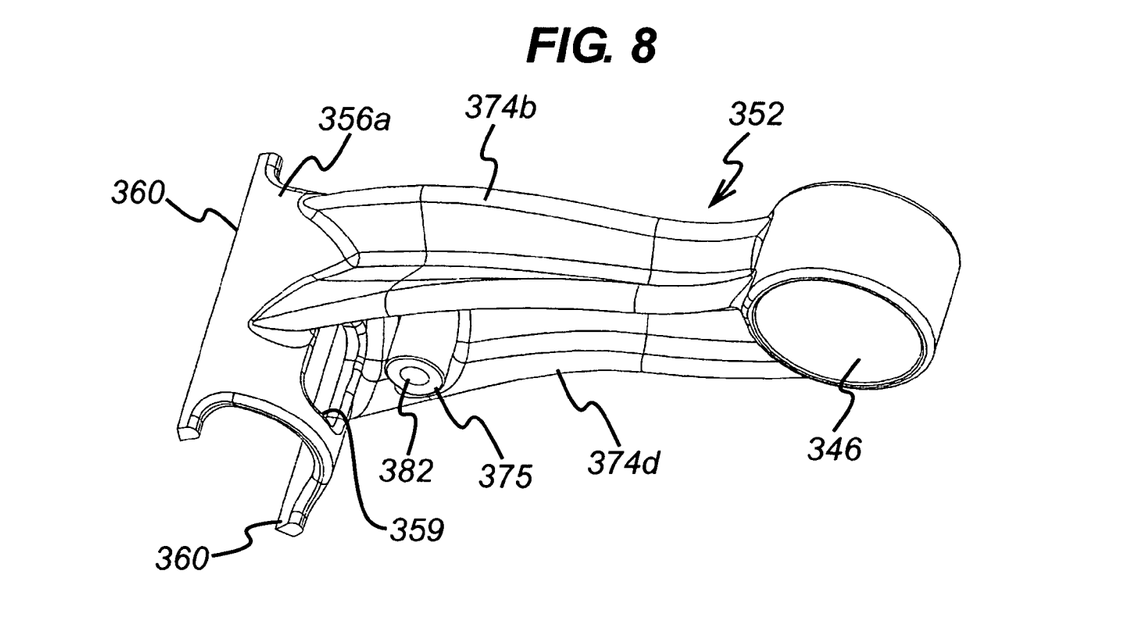
FIG. 8 is a perspective view of a portion of the trailing arm of FIGS. 5 and 6.

As shown in FIGS. 5 and 8, both the front axle wrap portion 356a and the rear axle wrap portion 356b are locally widened in the axial direction of the axle 42 close to edges 360 so that the length of the edges 360 increases. This provides a greater weld length between each edge surface, thereby providing a stronger join. Also, the weld between the two edges 360 does not terminate in line with the non-widened part of the inboard and outboard sides of the axle wrap portions 356a and 356b at a position where the stresses acting on the welds in use may be raised, thus increasing the risk of a failure in the weld. Smooth arcuate transition portions are provided between the widened portions and the non-widened portions of the outboard and inboard edges of the axle wrap portions 356a and 356b.

Referring in particular to FIG. 11, one edge-to-edge connection is illustrated in more detail before any welding has occurred, but with both axle wrap portions 356a and 356b offered up to an axle 42. Each edge 360 has a particular profile. In this case, the profile is formed by casting the trailing arm 332 as a single piece and subsequently machining the axle wrap portions 356a and 356b to give the required shape of the edges 360. In another embodiment, the front and rear sections of the arm portions 352 and 354 may be separately cast with the edge shapes already provided therein.

Specifically, and working radially inwards, each edge 360 includes a substantially planar surface 390 angled between 10° and 50°, preferably around 30°, to a radius of the axle wrap 356. The substantially planar surface 390 extends approximately 8 mm radially inwardly. A further surface 392 is then provided which extends approximately 1 mm radially inwardly and is substantially parallel to a radius of the axle wrap 356. Finally, an innermost portion of the edge 360 includes an undercut portion 394 that extends circumferentially for approximately 6 mm and terminates in a curved section to provide a smooth transition to a radially innermost face of the axle wrap 356. The undercut portion 394 has a depth of approximately 3 mm. The total thickness of the axle wrap portions 356a and 356b at this region is therefore less than 20 mm, and preferably less than 50 mm. This is particularly advantageous at the top of the trailing arm 332 because the trailing arm 332 may be used in "low mount" or low ride height applications without the trailing arm 332 hitting the chassis above. The thickness of the axle wrap portions 356a and 356b is preferably optimized to provide sufficient strength and stiffness without adding unnecessary weight to the trailing arm 332.

Assembly of the front arm portion 352 and the rear arm portion 354 of the trailing arm 332 around the axle 42 is as follows. The front and rear axle wrap portions 356a and 356b are offered up to the axle 42. The radius of the axle 42 and the axle wrap portions 356a and 356b are dimensioned to provide a close fit between an outer face of the axle 42 and inner faces of the axle wrap portions 356a and 356b. This may be achieved by machining the surfaces. The external radius of the axle 42 is ideally substantially identical to an internal radius of the trailing arm 332 (e.g., both are 126 mm, in one example). The tolerance in the radius of each axle wrap portion 356a and 356b is preferably approximately +0.1 mm to −0 mm, and the tolerance in the radius of the axle 42 is preferably +0 mm to −0.1 mm. In other words, the axle 42 should not be too large to fit within the axle wrap portions 356a and 356b, although a number of the advantages of the trailing arm 332 to the axle 45 connection may still apply if the tolerance is greater. However, the axle wrap portions 356a and 356b should be dimensioned circumferentially such that there is a gap of approximately 3 mm between the opposing surfaces 392 when the axle wrap portions 356a and 356b are in place around the axle 42. Once the axle wrap portions 356a and 356b have been offered up to the axle 42, a backing strip 396 that is approximately 15 mm wide and 3 mm deep is inserted into the undercut portion 394. The backing strip 396 is preferably made from a relatively soft metal, such as mild steel or a copper alloy, and is provided to prevent subsequent welds from fusing the axle wrap portion 356a and 356b to the axle 42. The backing strip 396 has also been found to improve the integrity of the weld by providing good root fusion.

In other embodiments, the backing strip 396 may be replaced by a lip provided on one of the wrap edges 360 that mate together, or a ceramic coating on the axle 42, for example.

The welding procedure is as follows. A "root pass" and first fill pass is carried out along one of the joints between the edges 360. Root passes and one or more fill passes are then carried out along the second joint until this is complete. The welding procedure may require as many as five separate passes. A completed transverse weld 397 having five passes is shown in FIG. 12. The remaining weld passes are then completed on the first joint. The welding is preferably carried out using a metal inert gas (MIG) or a metal active gas (MAG) process and a AR20CO$_2$ shielding gas mixture using a 1.2 mm diameter wire. The transverse welds are then allowed to cool naturally, which causes them to contract and pull the front and rear axle wrap portions 356a and 356b more tightly around the axle 42 such that the axle wrap portions 356a and 356b are in tension and the axle 42 is in compression.

The welds around the edge of the openings 358 and 359 are then carried out by welding around an entire circumference of each edge in multiple passes (again up to 5 separate passes) to weld the openings 358 and 359 to the axle 42. The circumference of each opening 358 and 359 is prepared such that there is approximately a 90° angle between the intersection of the edge of each opening 58 and 59 and the axle 42, and therefore there is a close fit between the axle wrap 356 and the axle 42 around the intersection of the edge. To enhance the durability of the welds, it is preferred that each weld run starts and finishes away from the corners of each opening 358 and 359. A cross-sectional view through a completed opening edge weld 398 is shown in FIG. 13. The openings 358 and 359 are located near a neutral axis of the axle 42, where bending stresses of the axle 42, in use, are at their lowest.

The welding procedure outlined above gives a particularly high strength and durable connection between the trailing arm 332 and the axle 42 when fitted to a vehicle and operated in normal circumstances. In some circumstances, the transverse welding causes the edges 360 of the front and rear axle wrap portions 356a and 356b to lift clear of the axle 42 by a small amount, which coupled with the close fit of the remainder of the axle wrap 356, may enhance durability.

If robotic welding techniques are to be used, the number of passes required at each joint may be reduced significantly, while still giving adequate strength to the connection.

The above described axle wrap to axle connection may enable thinner axle tubes to be used (e.g., 11 mm rather than 13 mm) to give the required strength for each axle 42, while saving weight. These benefits are thought to have been achieved due to a combination of the positioning of the welds in the axle wrap 356 and the axle wrap 356 being highly rigid and homogeneous so that it effectively distributes bending stresses and loads from the axle 42 through the trailing arm 332. These benefits are also achieved because the arrangement inhibits the axle 42 from bending locally around the welds due to its close fit.

The welding method has been found to improve the durability of the connection between the trailing arm 332 and the axle 42. In particular, it has been noted that providing the front opening 358 inboard of the web appears to be particularly effective in transmitting torsional loads induced in the axle 42 due to vehicle roll through the axle wrap 356 and into the trailing arm 332. By extending the axle wrap 356 inboard, the contact area of the axle wrap 356 with the axle 42 may be increased without interfering with the fitment of brakes and the like to the outboard end of the axle 42. In turn, this increased contact area enables the size of the openings 358 and 359 to be increased so that the length of the weld runs around the edges of the openings increases, and so does the strength of the connection.

The arm (not shown) provided for the opposite side of the vehicle is asymmetric with the arms of the present invention described above and is essentially a mirror image of these arms so that the various features of the arm may be provided in appropriate locations. However, the rear arm portions 354 and 454 may be interchanged between opposite sides of the vehicle so that the air spring mounting planar surface 350 and 450 is moved inboard to allow more clearance for vehicle wheels. This is particularly applicable when the arm is to be used with dual-wheel type vehicles. The rear arm portions

354 and 454 may also be altered to provide for different ride-height versions of the trailing arm without requiring alteration of the front section.

The terms such as front, rear, top, bottom, inboard and outboard as used herein to describe the orientation of the various components are for illustrative purposes only and should not be construed as limiting with respect of the orientation in which the trailing arm may be fitted in a particular vehicle. Similarly, any dimensions are used for illustrative purposes only and should not be construed as limiting, unless specifically claimed. It should be understood that the trailing arms according to the present invention may also be used as leading arms in which the mounting bracket is arranged aft of the air spring on a vehicle.

Numerous changes may be made within the scope of the present invention. For example, the trailing arm may be provided with an integral bracket for the fitment of drum brakes rather than disc brakes, or an integral cast drum brake component may be provided on the arm. The arm may be adapted for use with alternatives to air springs (such as coil springs, for example) and may be fitted to a monocoque-type chassis. Additional features may be cast into the arm, such as height control valve mountings and mountings for ABS and other sensors. The arm may be cast from three or more pieces should this be desirable or if a particular design of arm necessitates further cast pieces. The cast pieces may be secured together by other features such as bolts. The bracket for mounting a brake may be non-cast (e.g., fabricated). The arm may be adapted to receive non-circular (e.g., square) axles and may mount stub as well as beam axles.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A suspension trailing arm for suspending a vehicle chassis from a beam type axle, the suspension trailing arm comprising:
    a chassis mounting feature;
    an axle mounting feature; and
    an arm portion intermediate the chassis mounting feature and the axle mounting feature, wherein the arm portion has a generally X-section profile with four limbs, and two of the four limbs provide an upwardly facing trough when the suspension trailing arm is installed, wherein the upwardly facing trough extends generally longitudinally, and the two of the four limbs providing the upwardly facing trough are both upwardly inclined with respect to a plane extending horizontally in a direction transverse to a longitudinal direction of the upwardly facing trough.

2. The suspension trailing arm according to claim 1 wherein each of the four limbs has a radial length, and a thickness of one of the four limbs varies along the radial length of the one of the four limbs to terminate in an enlarged free end portion.

3. The suspension trailing arm according to claim 1 wherein the arm portion has a length, and the generally X-section profile varies along the length of the arm portion.

4. The suspension trailing arm according to claim 3 wherein an angle of one of the four limbs varies with respect to a neighbouring limb along the length of the arm portion.

5. The suspension trailing arm according to claim 3 wherein a thickness of one of the four limbs varies along the length of the arm portion.

6. The suspension trailing arm according to claim 3 wherein the radial length of one of the four limbs varies along the length of the arm portion.

7. The suspension trailing arm according to claim 1 wherein the chassis mounting feature is an integral feature of the suspension trailing arm.

8. The suspension trailing arm according to claim 1 wherein the axle mounting feature is an integral feature of the suspension trailing arm.

9. The suspension trailing arm according to claim 1 including an integral damper mount.

10. The suspension trailing arm according to claim 9 including a trough between two of the four limbs, wherein the integral damper mount locates a damper in the trough.

11. The suspension trailing arm according to claim 1 wherein the suspension trailing arm includes a recess to provide clearance for brake components.

12. The suspension trailing arm according to claim 1 wherein the axle mounting feature mounts a beam type axle.

13. The suspension trailing arm according to claim 12 wherein the axle mounting feature includes a bore extending transversely through the suspension trailing arm, wherein the bore is dimensioned to receive the beam type axle.

14. The suspension trailing arm according to claim 1 wherein the axle mounting feature includes a first semi-cylindrical wrap portion and a second semi-cylindrical axle wrap portion.

15. The suspension trailing arm according to claim 1 including an integral damper mount located in the trough.

16. The suspension trailing arm, according to claim 1 wherein the generally X-section profile is continuous along a length of the arm portion.

17. The suspension trailing arm according to claim 2 wherein the enlarged free end portion extends longitudinally with respect to the suspension trailing arm.

18. The suspension trailing arm according to claim 17 wherein the enlarged free end portion has a bulbous cross-section.

19. The suspension trailing arm according to claim 15, wherein the integral damper mount includes a bore extending substantially horizontally and substantially transverse to a longitudinal direction of the upwardly facing trough.

* * * * *